(No Model.) 2 Sheets—Sheet 2.
F. P. WILBER.
AUTOMATIC WAGON BRAKE.
No. 462,461. Patented Nov. 3, 1891.
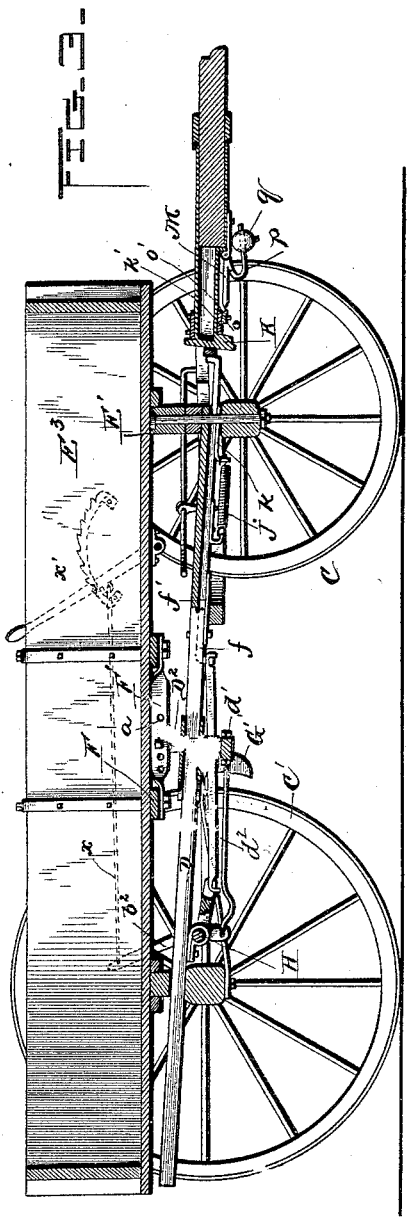
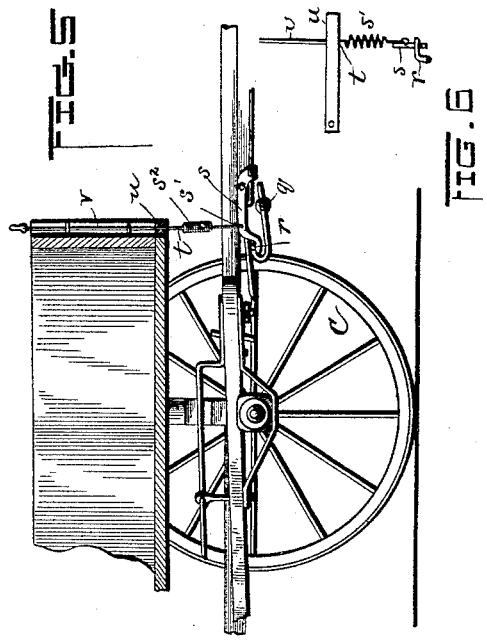
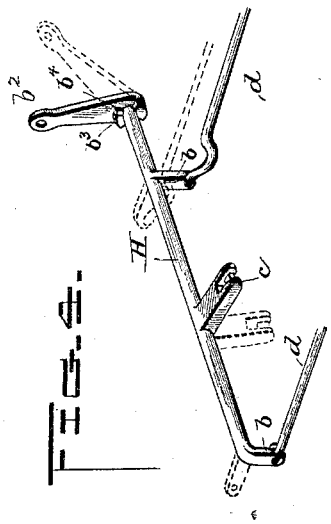
WITNESSES
F. L. Ourand
G. F. Downing
INVENTOR
F. P. Wilber
By Leggett & Leggett
Attorneys.

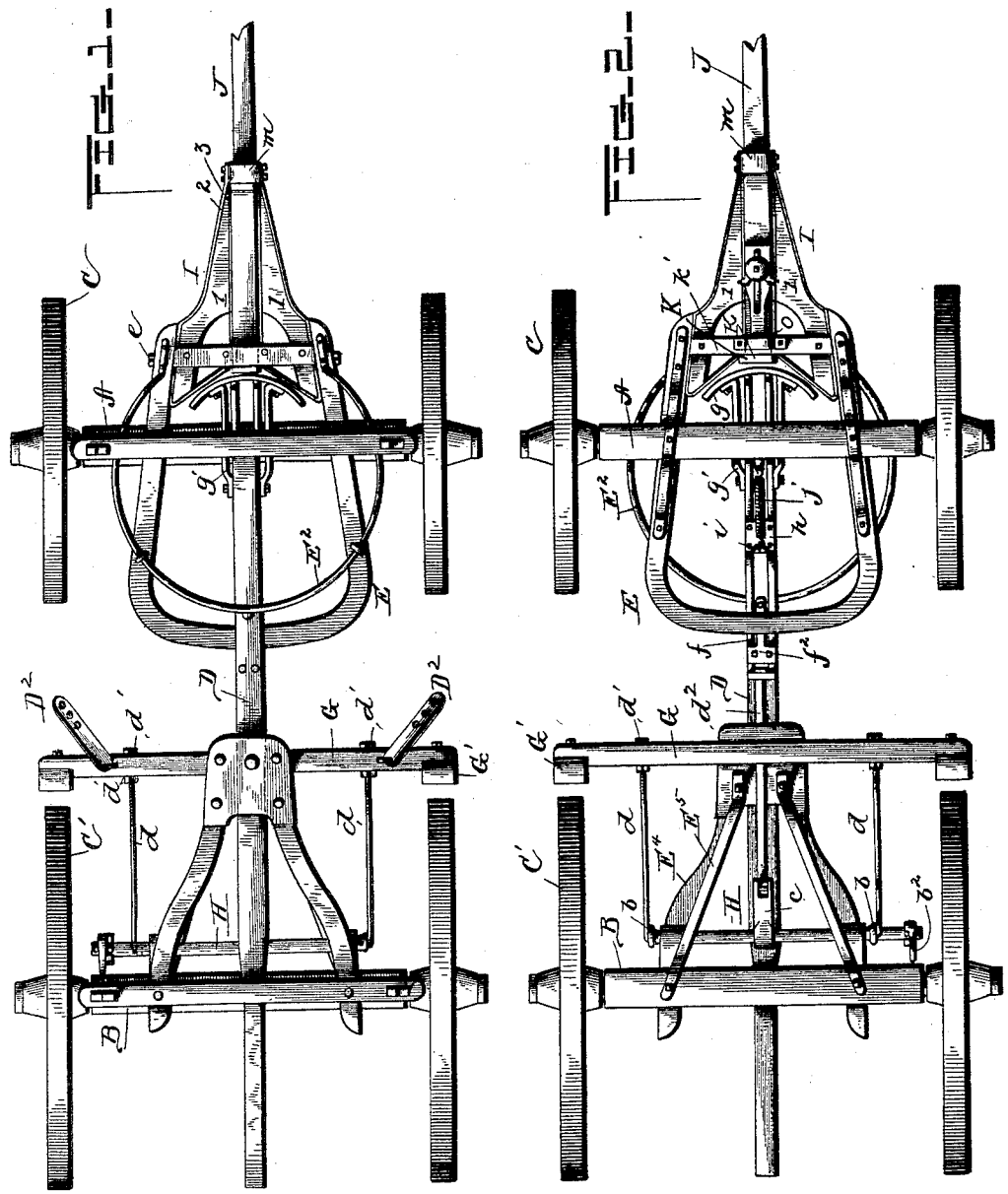

UNITED STATES PATENT OFFICE.

FRANK P. WILBER, OF CLYDE, OHIO.

AUTOMATIC WAGON-BRAKE.

SPECIFICATION forming part of Letters Patent No. 462,461, dated November 3, 1891.

Application filed November 15, 1890. Serial No. 371,499. (No model.)

*To all whom it may concern:*

Be it known that I, FRANK P. WILBER, a citizen of Clyde, in the county of Sandusky and State of Ohio, have invented certain new and useful Improvements in Automatic Wagon-Brakes; and I do hereby declare the following to be a full, clear, and exact description of the invention, such as will enable others skilled in the art to which it appertains to make and use the same.

My invention relates to an improvement in wagon-brakes, and more particularly to such as are adapted to operate automatically, its object being to furnish means for automatically applying the brakes to the wheels of a wagon during the descent of a hill or incline, and at the same time provide for automatically preventing the application of the same when it is desired to back the wagon; also, in the addition to a self-acting brake of devices for rendering it a perfect hand-brake.

With these objects in view the invention consists in certain novel features of construction and combinations and arrangements of parts, as hereinafter set forth, and pointed out in the claims.

In the accompanying drawings, Figure 1 is a top plan view with the wagon-body removed. Fig. 2 is a bottom plan view. Fig. 3 is a longitudinal sectional view showing the position of the weighted catch when the wagon is on a hill. Fig. 4 is a perspective view of the rock-shaft. Fig. 5 is a view of the hand mechanism for manipulating the gravity-catch. Fig. 6 is a detail view.

A and B represent, respectively, the front and rear axles of the wagon, carrying wheels C C C' C' and connected by a reach D in the usual manner. The front axle is secured to the hounds E and sand-board E'. A segmental rod or plate $E^2$ is secured to the hounds E and adapted to have sliding contact with the reach D. The rear axle is connected with the reach D by means of the hind hounds $E^4$, and preferably braced by means of rods $E^5$, connected at one end to the rear axle and at their other ends to the forward end of the hind hounds.

Secured to the wagon-body $E^3$, preferably at or near its center, is a frame F, to which are secured, at points in proximity to its ends, plates F', each having a series of perforations $a$ for the reception of the upper ends of rods $D^2$, the lower ends of which are attached by a loose connection with a brake-bar G. The brake-bar G is thus suspended from the wagon-body, and is provided at its ends with brake-shoes G', adapted to operate on the peripheries of the rear wheels C', as usual. Mounted on the hind hounds $E^4$, preferably in proximity to the rear axle, is a shaft H, having cranks $b\ b$ at or near its ends and a longer crank or lever $c$ at its center, the crank or lever $c$ being adapted to project forwardly and at an acute angle to the cranks $b$. The object of making the cranks $b$ project from the shaft H at an angle less than a right angle to the crank or lever $c$ is to bring said lever $c$ to a point a trifle below a horizontal plane at the same time that the cranks $b$ have reached a vertical position. An arm $b^2$ is mounted on one end (preferably the right-hand end) of the rock-shaft H, and provided on one face, at diametrically-opposite sides of said shaft, with projections $b^3$, adapted to engage a pin $b^4$ in the shaft and thus cause said shaft to rotate with it when actuated in a manner hereinafter explained. Rods $d$ are pivotally connected at one end to the cranks $b\ b$, and at their other or forward ends are provided with screw-threads and adapted to pass through perforations in a brake-bar G and nuts $d'$, placed on their screw-threaded ends at both sides of the brake-bars G.

The forward end of the crank or arm $c$ is bifurcated for the reception of the rear end of a push-bar $d^2$, which is pivotally connected to it, and said lever $c$ being disposed at an acute angle the shaft will be prevented from locking by the alignment of the said lever and push-bar $d^2$. The forward end of the push-bar is pivotally connected to a sliding plate or frame $f$. The plate or frame $f$ is mounted on the under side of the reach, (preferably in grooves $f'$ in the reach,) and is maintained in proper position by means of flanged plates $f^2$, secured to the reach, the forward end of said sliding plate or frame $f$ extending to a point beyond the front axle and within the hounds E. At the forward end of the plate or frame $f$ a horizontal segmental plate or bar $g$ is secured and braced by means of bars $g'$, which are bent laterally at their forward ends and secured to the plate or bar $g$ and at their rear ends are secured to the plate or frame $f$. A plate $h$ is secured to the plate or frame $f$ and provided with an ear $i$, to which one end of a coiled spring $j$ is secured, the other or forward end of said spring being secured to the reach D or to a plate $k$ secured thereto. From this construction it will be seen that the sliding plate or frame $f$ will be maintained normally at the forward extremity of its movement by means of the spring $j$ and that the crank or lever $c$ will also be maintained at the forward extremity of its throw, thus causing the brake-bar G to keep the shoes G' normally out of contact with the wheels.

Pivotally connected within the hounds E by means of a bolt $l$ are the tongue-hounds I, which may consist of parts 1 1, each having a metal plate 2 secured to its edges, said plates being so bent as to produce guides 3 between the hounds for the tongue. The tongue-hounds are also connected near their rear ends by a straight plate $k'$ and at their forward ends by a band $m$, through which band and between the guides 3 the tongue J is loosely inserted and adapted to have a sliding movement. The rear end of the tongue is provided with a preferably flat inclined plate K, adapted to bear squarely on the segmental plate or bar $g$. A catch M is pivotally connected to the under side of the tongue and adapted to normally engage a plate or stop $o$ on the plate $k'$ of the tongue-hounds. The stop $o$ is made with a shoulder adapted to bear against the edge of the plate $k'$ and provided in its end with a V-shaped notch $o'$ for the reception of the beveled end of the catch M. The catch M is provided with an arm $p$, on which a weight $q$ is adjustably placed, said weight being so arranged as to maintain the catch in contact with the stop $o$ while the wagon is on level ground, and so that when the wagon is inclined the weight $q$ will cause the catch to move out of engagement with the stop $o$. From this construction it will be seen that when the wagon reaches a hill and the horses hold back upon the tongue the plate or frame $f$ will move rearwardly, and, through the medium of the bar $d$, the shaft H will be turned and the brake-shoes applied to the rear wheels. When the wagon is on level ground, it may be backed without applying the brakes, as the catch M will engage the stop $o$ and thus prevent the rearward movement of the plate or frame $f$. In the modified form the arm $p$, or the catch itself, may be provided with a laterally-projecting arm $r$, adapted to be engaged by the lever $s$, pivoted to the side of the tongue and adapted to project underneath the same. The lever $s$ is provided with a perforation $s'$, at which point one end of the spring $s^2$ is connected to said lever. To the other end of the spring $s^2$ one end of a cord or chain $t$ is attached, the other end being connected to a lever $u$. A cord $v$ is attached to the lever $u$ above the spring and extended upwardly within reach of the driver. By manipulating this cord or chain the catch $s$ will be elevated and caused to lock the automatic brake mechanism, thereby permitting the wagon to be backed without applying the brakes. From this construction it will be seen that if the team should pull to one side or the other the lower end of the spring will be carried considerably to one side also. The upper end must remain in the center of the body, and as the spring is only long enough to reach between these two points when at their closest proximity, which is exactly vertical, it follows that the spring must expand or else the lock will be lifted to its place, which latter is always the case, as the spring is strong enough to lift the lock before it will expand. After the lock is lifted into place the spring expands to accommodate any further cramping of the wagon, and in this way nothing is strained or broken.

Connected to the upper end of the arm $b^2$ of rock-shaft H is a rod $x$, connected at its opposite end to the hand-lever $x'$, pivoted to the wagon-body, said lever being provided with a spring-catch adapted to engage a rack bar or segment on the wagon-body.

It is evident that slight changes might be made in the details of construction of my invention without departing from the spirit thereof or limiting its scope. Hence I do not wish to limit myself to the precise details of construction herein described; but, Having fully described my invention, what I claim as new, and desire to secure by Letters Patent, is—

1. The combination, with the running-gear of a wagon, of a sliding tongue, brake-shoes, depending links for loosely supporting said shoes, and a rock-shaft connected with the brake-shoes and adapted to be rocked by the sliding tongue, substantially as set forth.

2. The combination, with the running-gear of a wagon and brake mechanism, of a sliding tongue disconnected from the brake mechanism and adapted when moved backward to abut against the brake mechanism and apply the brakes, a gravity-catch or equivalent device constructed and adapted to automatically lock the tongue and prevent its backward-sliding movement when the vehicle is being backed, and a weight on the catch, substantially as set forth.

3. The combination, with a running-gear and a sliding tongue provided with an enlarged rear end, of a sliding plate or frame having a rounded segmental forward end, brake-shoes, a rock-shaft connected with the latter, and a push-rod connecting said shaft and slide-plate or frame, whereby the brake-shoes are applied by the sliding of the tongue, substantially as set forth.

4. The combination, with automatic brake mechanism and a sliding wagon-tongue, of a pivoted catch carrying a weight pivotally connected to said tongue, and a stop with which said catch is adapted to engage to lock the tongue, substantially as set forth.

5. In an automatic wagon-brake, the combination, with the brake-bar and shoes, of a rock-shaft connected with the brake-bar, a sliding plate or bar connected with the rock-shaft, a spring for normally forcing said bar forward and maintaining the brake-shoes from the wheels, and a sliding tongue disconnected therefrom adapted to actuate the sliding plate or bar and apply the brakes by its abutment against said bar or plate, substantially as set forth.

6. The combination, with a wagon, of plates having a series of perforations therein secured to the body of said wagon, a brake-bar suspended from said plates, a rock-shaft having cranks at its ends, rods connecting said cranks with the brake-bar, a crank or lever projecting from the rock-shaft, a bar connected with said lever, a sliding plate connected with said bar, a spring secured at one end to the sliding plate and at the other end to the wagon-reach, and a sliding tongue for actuating said sliding plate, substantially as set forth.

7. The combination, with brake mechanism, a sliding tongue disconnected from the brake mechanism, but adapted to co-operate therewith, and a catch for locking the tongue, of a spring connected at one end to the catch mechanism and at the other end to a cord or chain for manipulating said catch mechanism, substantially as set forth.

8. In an automatic brake, the combination, with a sliding tongue and a catch for locking the brake, of a lever to engage said catch, a spring attached to said lever, and a cord or chain connected to the spring, substantially as set forth.

9. The combination, with a brake-bar and sliding tongue, of a rocking bar having cranks that normally extend approximately at right angles from the wagon-gear, and an arm located between these cranks that extends forward at an angle to the cranks somewhat less than a right angle, said rock-shaft being constructed to make a quarter-turn to bring said cranks on the rear center of said rocking bar and the aforesaid arm to a position somewhat back of a plane at right angles to the wagon-gear, substantially as set forth.

In testimony whereof I have signed this specification in the presence of two subscribing witnesses.

FRANK P. WILBER.

Witnesses:
R. S. FERGUSON,
S. G. NOTTINGHAM.